No. 612,332.   Patented Oct. 11, 1898.
C. L. GROHMANN.
ATTACHMENT FOR METAL WORKING MACHINES.
(Application filed Oct. 28, 1897. Renewed Sept. 16, 1898.)
(No Model.)

Witnesses:
O. W. Smith
Fred. J. Dole

Inventor:
Carl L. Grohmann.
By his Attorney,
F. H. Richards.

UNITED STATES PATENT OFFICE.

CARL L. GROHMANN, OF HARTFORD, CONNECTICUT.

ATTACHMENT FOR METAL-WORKING MACHINES.

SPECIFICATION forming part of Letters Patent No. 612,332, dated October 11, 1898.

Application filed October 28, 1897. Renewed September 16, 1898. Serial No. 691,087. (No model.)

*To all whom it may concern:*

Be it known that I, CARL L. GROHMANN, a citizen of the United States, residing in Hartford, in the county of Hartford and State of Connecticut, have invented certain new and useful Improvements in Attachments for Metal-Working Machines, of which the following is a specification.

This invention relates to metal-working machines, the object thereof being to provide an improved attachment or chuck that is simple in construction and is operable firmly to hold the work-holding dog against movement, so that chattering or wabbling of the work is prevented, the attachment being mounted on the live-spindle to impart to the work the necessary rotation and being especially intended for use with milling-machines, although it is not limited thereto.

My improved device consists of a chuck having two members equipped, respectively, with jaws for gripping the shank of a work-holding dog, one of said members being provided with means for attaching it to the live-spindle of the machine and the other being movable toward and from the complemental member to adapt the device to different sizes of work-holding dogs, means being provided to hold the movable member in position to clamp the shank of the dog.

Figure 3:
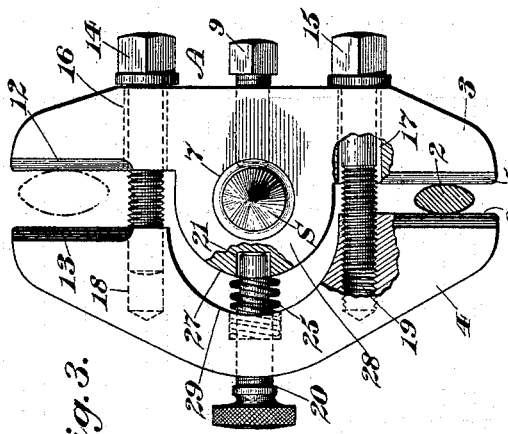
Figure 4:
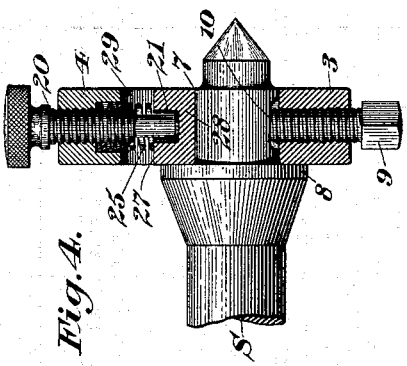
Figure 1:
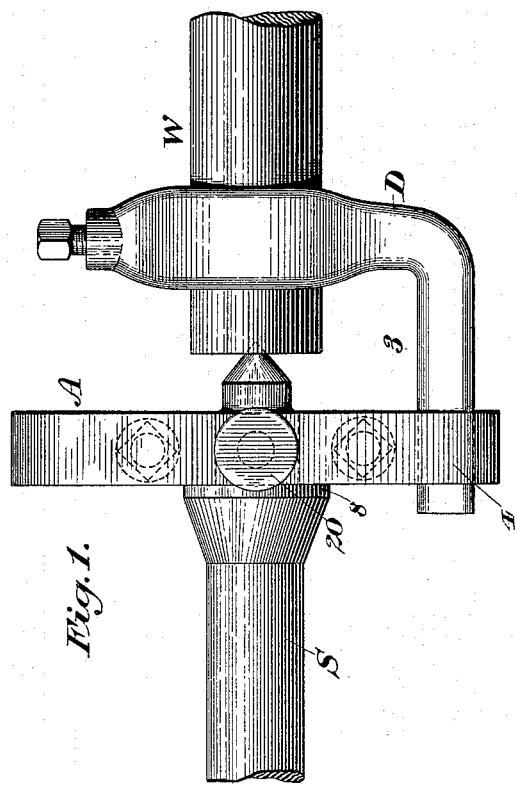
Figure 2:
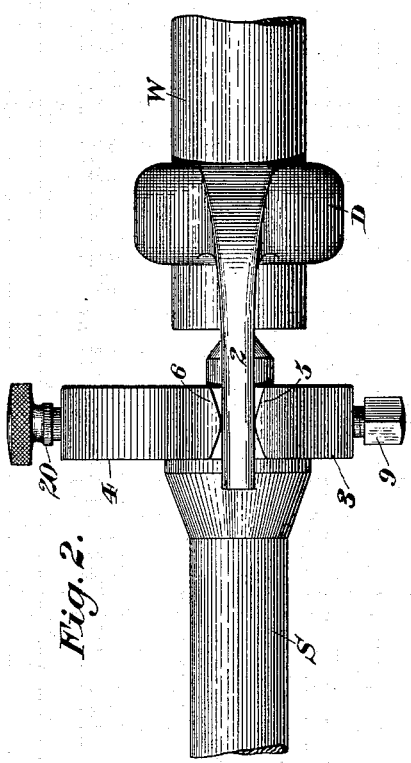

In the drawings accompanying and forming part of this specification, Figure 1 is a side elevation of a portion of a machine, showing my attachment thereon. Fig. 2 is a view seen from the under side of Fig. 1. Fig. 3 is a face view of the attachment, the shank of the dog being shown in cross-section; and Fig. 4 is a sectional view of the device, showing it in position on the live-spindle.

Similar characters designate like parts in all the figures of the drawings.

The live-spindle of the machine is designated by S, the work by W, and the dog by D, the spindle and dog being of the ordinary construction and the shank 2 of the latter being gripped by the chuck to hold said dog against movement and also to effect the rotation of the work W with the spindle.

My improved attachment is designated by A, and it consists of two parallel members, as 3 and 4, having beveled jaws 5 and 6, one of which members, as 3, is secured to the spindle S and the other is movable toward its companion to grip or clamp the shank 2 of the dog, a suitable device being provided to hold the movable clamp-section against said shank.

To mount the stationary chuck-section on the spindle S, it is bored at 7 to receive said spindle and is driven thereon until it abuts against the shoulder 8. To prevent the stationary chuck-section from turning on the spindle, it is provided with a set-screw 9, the inner end of which is adapted to bind against the periphery of said spindle or the flat face 10 thereon. (See Fig. 4.)

It will be understood from the preceding description that the jaw 6 of the chuck-section 4 is adjustable toward and from its companion or complemental jaw and that the device is therefore adapted to grasp the shanks of dogs of different sizes, the jaws 5 and 6 being especially applicable to the smaller sizes.

To apply the device to the shanks of work-holding dogs of large size, the respective sections of the chuck are provided at the opposite end with a second pair of jaws 12 and 13, which are farther apart than the other pair, as shown in Fig. 3.

The two sections of the chuck are held assembled by the clamping-screws 14 and 15, the shanks or stems of which pass through the transverse openings 16 and 17 in the stationary clamp-section 3, the inner ends of the screws being threaded into the nuts or seats 18 and 19, respectively, on the adjustable chuck-section 4. The openings 16 and 17 are somewhat larger in diameter than the clamp and holding screws 14 and 15 for a purpose hereinafter stated, and the walls thereof are plain, so that the shanks of the two screws freely slide through said openings when the chuck-section 4 is moved toward or from the companion section to adjust the same. The diameters of the openings 16 and 17 exceed those of the corresponding screws, so that said screws are free to have slight lateral play when one of them is operated to clamp the shank of the dog, whereby the device may be applied to the shanks of dogs that are bent or distorted and will effectually clamp the same.

In the movable chuck-section 4 a screw or like device 20 is mounted intermediate the seats or nuts 18 and 19, which receive the threaded ends of the screws 14 and 15. The inner end of the screw 20 is plain, as shown in Figs. 3 and 4, and when the sections are in position it enters the recess or pocket 21 in the stationary chuck-section 3, said recess having a diameter slightly exceeding that of the plain point of the screw, so that when either of the adjusting or holding screws is manipulated the parts may have a slight lateral play.

In Fig. 3 the jaws 5 and 6 of the chuck are illustrated as clamping the shank 2 of a work-holding dog of comparatively small size; but when it is necessary to employ one of large size the dog is first fitted to the work in the usual manner, and the shank thereof is inserted between the beveled jaws 12 and 13 at the opposite end of the chuck. Surrounding the screw 20 is a coiled spring 25, the outer end of which is seated in a socket in the section 6, while its inner end bears against the projection or rounded protuberance 27 of the section 3. This spring serves normally to hold the jaws apart and when the screws are loosened aids in opening said jaws.

As will be observed, a convex protuberance or projection 28 is formed on the section 3 of the attachment, and a depression 29, having a concave wall, is formed in the section 6. By virtue of this construction when the sections are drawn closely together by the screws one part will rest against the other, and the device will be held in a compact condition for transportation or other purposes. As is obvious, the point or tip of the screw 20, being of somewhat smaller diameter than the pocket in which it is placed, a slight play of the parts on each other is permitted when either adjusting-screw is tightened to cause the jaws to grip the shank of the dog. This operation is also aided by the enlarged perforations, through which the shanks of the adjusting-screws pass. In the operation of the device the two halves of the attachment are pressed together by hand until the jaws clutch the shank on either side. The centrally-disposed screw is then turned downward until its end touches the bottom of the pocket or recess in the section 3, and the screw that is between it and the shank of the dog will then be drawn up tight, thus holding said shank without cramping of the various parts.

By beveling the gripping-jaws as shown they will positively and firmly bite the shank of the dog at opposite points, no matter to what extent said shank may be distorted or bent, so that the work will be held firmly and will not spring while it is in the machine.

Having described my invention, I claim—

1. An attachment for metal-working machines, comprising a chuck having two members one of which is provided with means for connecting it to the live-spindle and the other of which is movable toward and from the companion member and each of which is equipped with a jaw for gripping the shank of a work-holding dog; a device carried by one member and bearing against the other member; and means for holding the movable member of the chuck in an adjusted position.

2. An attachment for metal-working machines, comprising a chuck having two members one of which is provided with means for attaching it to the live-spindle and the other of which is movable back and forth and each of which is equipped with a jaw for gripping the shank of a work-holding dog; a device carried by the movable member and bearing against the stationary member; and a screw threaded into the movable member and passing through an opening in said stationary member, the wall of said opening being plain.

3. An attachment for metal-working machines, comprising a chuck having two members one of which is provided with means for attaching it to the live-spindle and the other of which is movable back and forth; a screw threaded into the movable member and in position to bear against the other member; and a second screw threaded into said movable member and passing through an opening in the stationary member, the wall of said opening being plain.

4. An attachment for metal-working machines, comprising a chuck having two members one of which is provided with means for attaching it to the live-spindle and the other of which is movable back and forth, the respective sections being equipped with parallel jaws having beveled surfaces adapted to grip the shank of a work-holding dog; and means for holding the movable member of the chuck in adjusted position.

5. An attachment for metal-working machines, comprising a chuck having two members one of which is provided with means for attaching it to the live-spindle and the other of which is movable back and forth and each of which is provided with a jaw for gripping the shank of a work-holding dog; means for holding the movable member of the chuck in an adjusted position; and a spring acting against the respective chuck-sections.

6. An attachment for metal-working machines, comprising a chuck having two members one of which is provided with means for attaching it to the live-spindle and the other of which is movable back and forth and each of which is provided with jaws at its opposite ends; holding and attaching screws threaded into movable sections of the chuck, near the opposite ends thereof, and passing through plain openings in the stationary chuck-section; a third screw intermediate the first-mentioned screws and threaded into the movable chuck-section, its inner end bearing against the stationary chuck-section; and a spring surrounding said screw and acting against two members of the chuck.

7. An attachment for metal-working machines, comprising a chuck having two members one of which is provided with means for attaching it to the live-spindle and the other of which is movable back and forth, one of the chuck-sections having a convex portion adapted to fit in a concavity on the other; and means for holding said chuck-sections assembled.

CARL L. GROHMANN.

Witnesses:
L. E. HARPER,
HENRY BISSELL.